UNITED STATES PATENT OFFICE.

THOMAS COPLAND, OF HAMILTON, CANADA.

IMPROVEMENT IN MEDICAL COMPOUNDS.

Specification forming part of Letters Patent No. 133,924, dated December 17, 1872.

*To all whom it may concern:*

Be it known that I, THOMAS COPLAND, of the city of Hamilton, in the county of Wentworth, in the Province of Ontario, Canada, chemist, have invented a certain Compound, called Copland's Sweet Castor-Oil, to be used as a pleasant medicine for children and adults, instead of the nauseous castor-oil now used, of which the following is a specification:

It is sweet to the taste, of unaltered strength, and, being prepared in strict accordance with chemical principles, it is an actual improvement on the oil itself, without in the slightest degree interfering with its medical properties.

To prepare the sweet castor-oil, take of oil of lemon, two drams; oil of cinnamon, one dram; essential oil of almonds and oil of aniseseed, of each, one-half a dram, for flavoring the oil. Then add for sweetening ten and one-half drams chloroform; pure spirit, two ounces; and add the whole to one gallon of best castor-oil, and mix thoroughly.

Compared with ordinary castor-oil it is easily taken or administered without any vehicle, as coffee, milk, liquors, &c. Chloroform is superior to all other sweeteners for medical purposes, as it does not interfere with the properties or strength of the oil, except so far as it enhances its value, while all others require to be used in such quantities as to seriously interfere with and injure the medical property of the castor-oil.

The principal advantages of the sweet castor-oil are: nausea is reduced to a minimum, and it acts with more certainty and less griping.

I do not claim any particular composition for flavoring castor-oil; but

What I do claim as of my invention, and desire to secure by Letters Patent, consists of—

A compound of castor-oil ordinarily used as a medicine and chloroform as a sweetening principle, in combination with the flavoring described, or any other, substantially in the proportions and for the purpose set forth.

Dated at Hamilton, Canada, this 22d day of October, A. D. 1872.

THOMAS COPLAND.

Signed in the presence of—
WM. BRUCE,
P. L. SCRIVEN.